United States Patent
Seki

(10) Patent No.: US 11,480,814 B2
(45) Date of Patent: Oct. 25, 2022

(54) SPECTACLE-LIKE FRAME

(71) Applicant: Norio Seki, Shizuoka (JP)

(72) Inventor: Norio Seki, Shizuoka (JP)

(*) Notice: Subject to any disclaimer, the term of this patent is extended or adjusted under 35 U.S.C. 154(b) by 181 days.

(21) Appl. No.: 16/756,664

(22) PCT Filed: Oct. 16, 2018

(86) PCT No.: PCT/JP2018/038531
§ 371 (c)(1),
(2) Date: Apr. 16, 2020

(87) PCT Pub. No.: WO2019/078214
PCT Pub. Date: Apr. 25, 2019

(65) Prior Publication Data
US 2020/0333629 A1 Oct. 22, 2020

(30) Foreign Application Priority Data
Oct. 20, 2017 (JP) .................. 2017-004798

(51) Int. Cl.
*G02C 7/08* (2006.01)
*G02C 1/06* (2006.01)

(52) U.S. Cl.
CPC ............... *G02C 7/086* (2013.01); *G02C 1/06* (2013.01)

(58) Field of Classification Search
USPC .............................................. 351/55, 57, 58
See application file for complete search history.

(56) References Cited

U.S. PATENT DOCUMENTS

| 2,842,029 | A | 7/1958 | Roth |
| 7,018,035 | B1 | 3/2006 | Herold et al. |
| 8,496,329 | B2 | 7/2013 | Spivey et al. |
| 2005/0128428 | A1* | 6/2005 | Hamaker .......... G02C 9/00 351/57 |
| 2012/0057124 | A1 | 3/2012 | Spivey et al. |
| 2017/0176751 | A1 | 6/2017 | Ouderkirk et al. |
| 2018/0231803 | A1* | 8/2018 | Gromotka .......... G02C 7/081 |

FOREIGN PATENT DOCUMENTS

| CN | 203720459 U | 7/2014 |
| CN | 106164746 A | 11/2016 |
| CN | 205982886 U | 2/2017 |
| DE | 3909131 A1 | 12/1989 |
| JP | H7-140432 A | 6/1995 |
| JP | H11-030768 A | 2/1999 |
| JP | H11-305169 A | 11/1999 |

(Continued)

OTHER PUBLICATIONS

Chinese Office Action for the corresponding Chinese Patent Application No. 2018-80068231.2, dated Nov. 20, 2020 (9 pages).

*Primary Examiner* — Darryl J Collins
(74) *Attorney, Agent, or Firm* — Harness, Dickey & Pierce, P.L.C.

(57) ABSTRACT

An eyeglass-shaped frame includes: a pair of lens-holding frames configured to hold lenses; a bridge connecting the pair of lens-holding frames; a temple foldably attached at a front end side thereof; a nose pad configured to support a nose in contact; movable lens-holding frames configured to be placed oppositely in front of the lens-holding frames; and a vertical movement unit configured to vertically move each of the movable lens-holding frames.

12 Claims, 5 Drawing Sheets

(56) References Cited

FOREIGN PATENT DOCUMENTS

| | | |
|---|---|---|
| JP | 2014-041218 A | 3/2014 |
| JP | 6027820 B2 | 11/2016 |
| JP | 2017-514168 A | 6/2017 |
| JP | 2017-129713 A | 7/2017 |
| KR | 10-1262023 B1 | 5/2013 |
| WO | 2010-067877 A1 | 6/2010 |
| WO | 2017-110858 A1 | 6/2017 |

* cited by examiner

SPECTACLE-LIKE FRAME

CROSS-REFERENCE TO RELATED APPLICATIONS

This application is a U.S. National Phase Application of International Application No. PCT/JP2018/038531, filed on Oct. 16, 2018, which claims priority to Japanese Patent Application No. 2017-004798, filed on Oct. 20, 2017. The entire disclosures of the above applications are incorporated herein by reference.

BACKGROUND

Technical Field

The present invention relates to an eyeglass-shaped frame.

Related Art

An eyeglass-shaped frame where another pair of eyeglass lenses is attachable in front of eyeglass lenses (optical member) has been known.

In addition, an eyeglass-shaped frame usable for a wearable terminal in an eyeglass form (also referred to as smartglasses) has been known.

Examples of eyeglasses where another pair of eyeglass lenses is attachable in front of an eyeglass lens include front-hanging sunglasses removably attachable to eyeglasses and flip-up sunglasses attached to eyeglasses. The front-hanging sunglasses cannot be flipped up when the eyeglasses are worn, and are easy to lose and easily breakable by pressure or the like after removed from the eyeglasses. Meanwhile, the flip-up sunglasses have a complicated pivot structure between the flip-up sunglasses and the eyeglasses.

In addition, JP 11-30768 A proposes auxiliary eyeglasses including auxiliary lenses disposed in front of lenses, a movement mechanism configured to vertically move the auxiliary lenses, and an attachment unit for removably attaching the auxiliary lenses to the eyeglasses. An object of the auxiliary eyeglasses is to enable different types of vision correction to be performed while keeping a line of sight straight, thereby enabling a comfortable use state.

Nonetheless, the movement mechanism of JP 11-30768 A includes a slide frame in a portal form of a metal linear body and a fixation frame holding the slide frame. In addition, a lower end of a slide portion of the slide frame is embedded inside the auxiliary lenses and the auxiliary lenses are lifted up by the slide portion for the vertical movement. Thus, an outside of each of the auxiliary lenses is likely to be unstable and, further, the movement mechanism enters a field of view, which irritates or annoys a wearer. In addition, the auxiliary eyeglasses of JP 11-30768 A is further provided with an attachment unit for the auxiliary lens, resulting in a complicated structure.

Moreover, in the above typical technology, there is not idea of situationally using a plurality of optical members, such as different types of lenses and displays, for a single eyeglass-shaped frame.

An object of the invention is to provide an eyeglass-shaped frame where an optical member such as another pair of lenses or displays is disposed in front of lenses and vertically movable, thereby enabling a wearer to situationally use two types of optical members such as lenses at a constant eye level (wearing state) of the wearer.

SUMMARY

According to an aspect of the invention, an eyeglass-shaped frame includes: a pair of lens-holding frames each configured to hold an optical member comprising a lens; a bridge connecting the pair of lens-holding frames; a temple attached, at a front end side thereof, to each of the lens-holding frames; a nose pad configured to support a nose in contact; movable lens-holding frames configured to be placed oppositely in front of the lens-holding frames; and a vertical movement unit configured to vertically move each of the movable lens-holding frames.

It is preferable that the optical member includes a display, and the lens-holding frames or the movable lens-holding frames are configured to hold the display.

As in the aspect of the invention, an eyeglass-shaped frame at least including a pair of lens-holding frames configured to hold lenses, a bridge connecting the pair of lens-holding frames, a temple foldably attached at a front end side thereof, and a nose pad configured to support a nose in contact is provided with movable lens-holding frames configured to be placed oppositely in front of the lens-holding frames and a vertical movement unit configured to vertically move each of the movable lens-holding frames. This allows another pair of lenses or the like disposed in front of lenses to vertically move, thereby making it possible to situationally use the two types of lenses, or the like. Further, an eye level of a wearer is not shifted (changed), considerably enhancing easiness in seeing. It should be noted that the "lenses or the like" include colored glasses, plain glasses, polarizer glasses, and wearable terminal glasses in addition to the lenses.

In the eyeglass-shaped frame according to the above aspect, it is preferable that the vertical movement unit include: a support shaft formed in a substantial J-shape and fixed to a front end of the temple with the substantial J-shape inverted back to front; a bearing configured to receive the support shaft therein to be vertically movable while coupled to each of the movable lens-holding frames; and a stopper member configured to hold each of the movable lens-holding frames above corresponding one of the lens-holding frames.

As in the aspect of the invention, the vertical movement unit includes a support shaft formed in a substantial J-shape and fixed to a front end of the temple with the substantial J-shape inverted back to front, a bearing configured to receive the support shaft therein to be vertically movable while coupled to each of the movable lens-holding frames, and a stopper member configured to hold each of the movable lens-holding frames above corresponding one of the lens-holding frames. This allows for restricting a movement of an outside of each of the movable lens-holding frames in a case where two types of lenses are situationally used by vertically moving another pair of lenses or the like disposed in front of lenses, thereby considerably reducing wobbliness of the another pair of lenses and, consequently, making the vertical movement easy and enhancing easiness in seeing with less eye strain.

In the eyeglass-shaped frame according to the above aspect, it is preferable that the vertical movement unit include: a support column that is in a form of a rectangular column with a guide groove and fixed, at an upper portion thereof, to a front end of the temple; an insertion piece configured to receive the support column therein to be vertically movable while fixed to each of the movable lens-holding frames; and a stopper member configured to hold each of the movable lens-holding frames above corresponding one of the lens-holding frames.

As in the aspect of the invention, the vertical movement unit includes a support column that is in a form of a rectangular column with a guide groove and fixed, at an upper portion thereof, to a front end of the temple, an insertion piece configured to receive the support column therein to be vertically movable while fixed to a lower portion of each of the movable lens-holding frames, and a stopper member configured to hold each of the movable lens-holding frames above corresponding one of the lens-holding frames. This provides effects similar to those described above.

DETAILED DESCRIPTION

Figure 1:
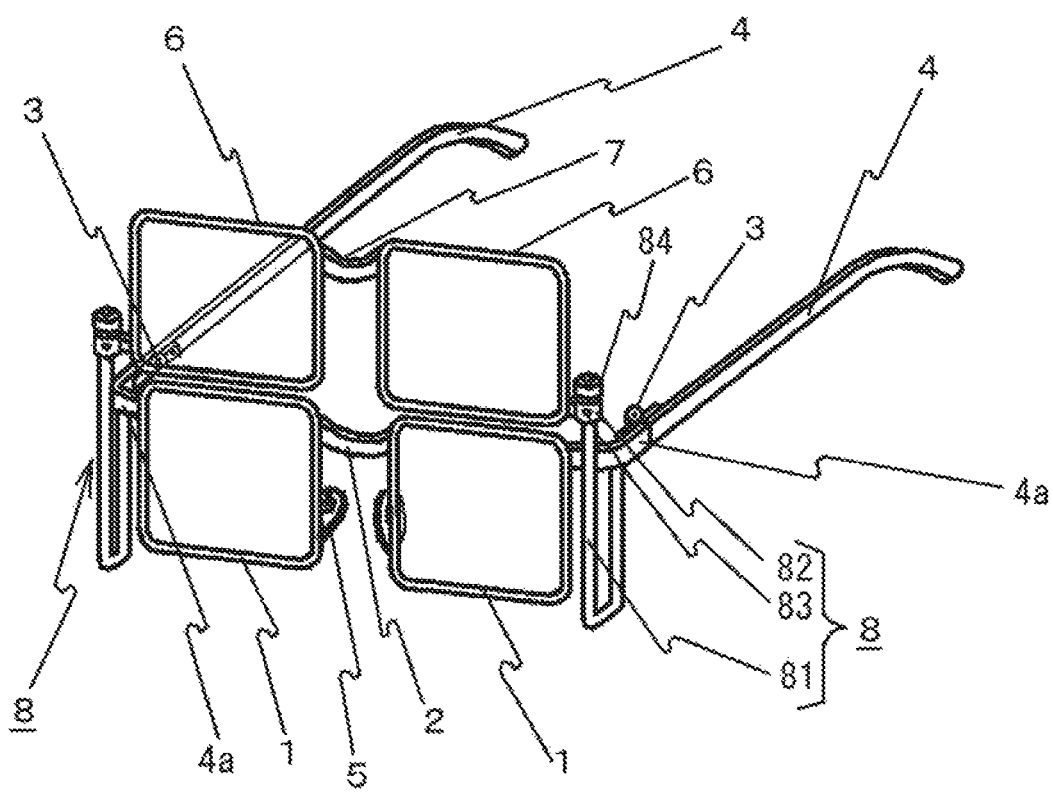
FIG. 1 is an explanatory view showing an exemplary embodiment of the invention.

Exemplary embodiment(s) of the invention will be described below with reference to FIG. 1.

A pair of lens-holding frames 1 are configured to hold lenses. The lens-holding frames 1 surround outer peripheries of the corresponding lenses as shown in the figure but the invention is not limited thereto. For instance, lens-holding frames 1 for frameless eyeglasses may be used. In addition, a shape of each of the lens-holding frames 1 is not necessarily a substantial rectangle but may be a substantial circle, a substantial oval, or any other shape.

Examples of the lenses held by the lens-holding frames 1 include a variety of light transmissive members such as a concave lens, a convex lens, a sheet glass (a plain or a polarizer), a colored glass (e.g., sunglass), and a wearable terminal glass (occasionally referred to as a display of a wearable terminal in an eyeglass form). The wearable terminal glass, which is a light transmissive member constituting a display of a transmissive (see-through) wearable terminal in an eyeglass form, is configured to display information projected from a projector (not shown). The wearable terminal glass includes therein an optical device such as a prism, a mirror, a semitransparent mirror, or a hologram device. It should be noted that the projector may be held by the lens-holding frames 1 or may be held by a later-described bridge 2 or temple 4. A shape of the lens is not necessarily a rectangle shown in FIG. 1 but may be a circle, an oval, or any other shape. In addition, the lenses may be integrated into a single lens instead of being separate lenses.

The bridge 2 connects the pair of lens-holding frames 1. An attachment position of the bridge 2 is at an upper portion of each of the lens-holding frames 1 but not limited to the upper portion.

The temple 4, which is at an outside of each of the lens-holding frames 1, is foldably attached, at a front end side thereof, to the lens-holding frame 1 via a hinge 3. It should be noted that a shape of the temple 4 may be a substantially triangular shape as goggles instead of a rod shape as shown in the figure. In this case, a variety of components such as a switch and a power cord can be easily disposed when the wearable terminal glass is attached to later-described movable lens-holding frames 6.

A nose pad 5 is configured to support a nose in contact.

The movable lens-holding frames 6 are oppositely disposed in front of the lens-holding frames 1. The movable lens-holding frames 6 are of substantially the same material and in the same shape as the lens-holding frames 1. It should be noted that a size of the movable lens-holding frames 6 are not necessarily the same as that of the lens-holding frames 1. Further, examples of the lenses held by the movable lens-holding frames 6 may be the same as those of the lenses held by the lens-holding frames 1.

A movable bridge 7 connects the pair of movable lens-holding frames 6.

A vertical movement unit 8 is a unit configured to vertically move each of the movable lens-holding frames 6. The vertical movement unit 8 includes a support shaft 81 formed in a substantial J-shape and fixed to a front end 4a of the temple 4 with the substantial J-shape inverted back to front, a bearing 82 configured to receive the support shaft 81 therein to be vertically movable while coupled to each of the movable lens-holding frames 6, and a stopper member 83 configured to hold each of the movable lens-holding frames 6 above the corresponding one of the lens-holding frames 1, and an antidrop member 84 configured to prevent the bearing 82 from dropping off the support shaft 81. The stopper member 83 preferably has such a structure that a protrusion (e.g., a spherical body) is biased with elastic force to press the support shaft 81. For instance, the stopper member 83 may have a structure (not shown) where a hole is bored in the bearing 82, the hole receives therein the spherical body and a spring and is closed with a screw or the like to prevent the spherical body and the spring from dropping off, and a portion of the spherical body is projectable from an inside of the bearing 82, while a recessed hole 81a for engagement with the portion of the spherical body is provided at an upper portion of the support shaft 81 as shown in FIG. 3B.

Figure 2:
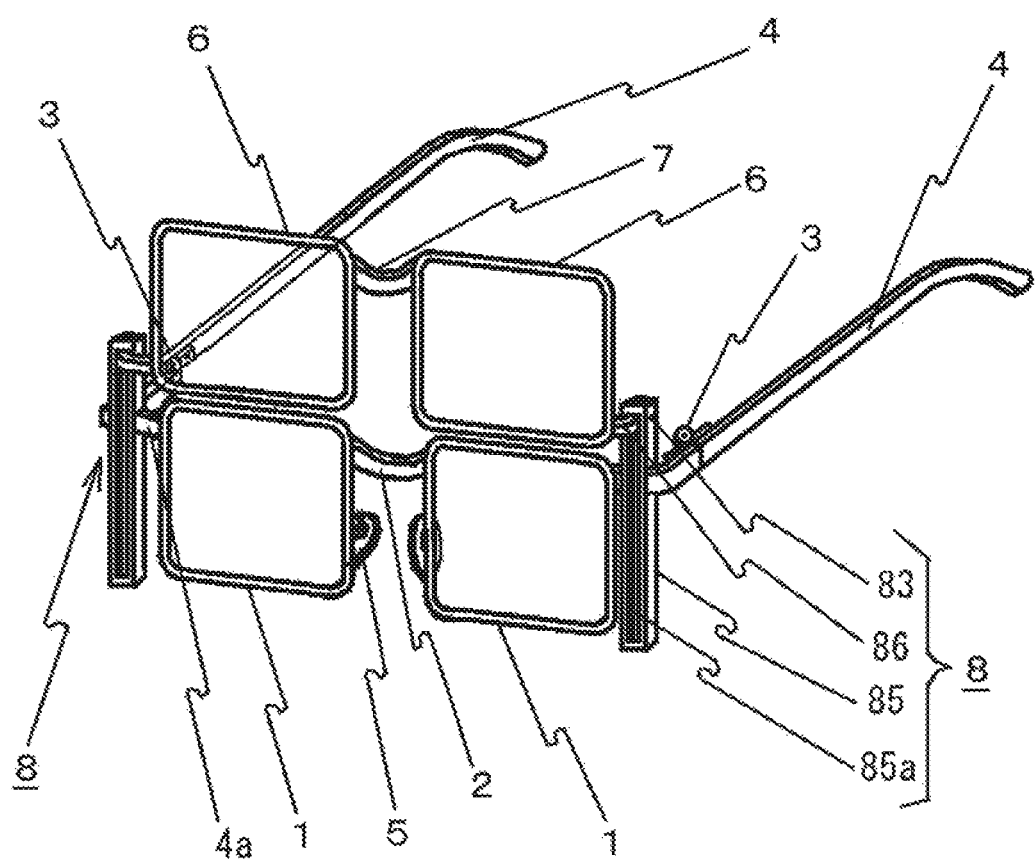
FIG. 2 is a perspective view showing use of a vertical movement unit according to the invention.

FIG. 2 shows another vertical movement unit 8A, which will be described. The vertical movement unit 8A includes: a support column 85 that is in a form of a rectangular column with a guide groove 85a and fixed, at an upper portion thereof, to the front end 4a of the temple 4; an insertion piece 86 configured to receive the support column 85 therein to be vertically movable while fixed to a lower portion of each of the movable lens-holding frames 6; and the stopper member 83 configured to hold each of the movable lens-holding frames 6 above the corresponding one of the lens-holding frames 1. The support column 85 may be in a form of a cornered cylinder instead of being in the form of a rectangular column and a length of the guide groove 85a is preferably slightly longer than a possible distance of the vertical movement of each of the movable lens-holding frames 6. Further, the stopper member 83 is not limited to a ball and a spring but may be any component capable of holding each of the movable lens-holding frames 6 above the corresponding one of the lens-holding frames 1.

Figure 3A:
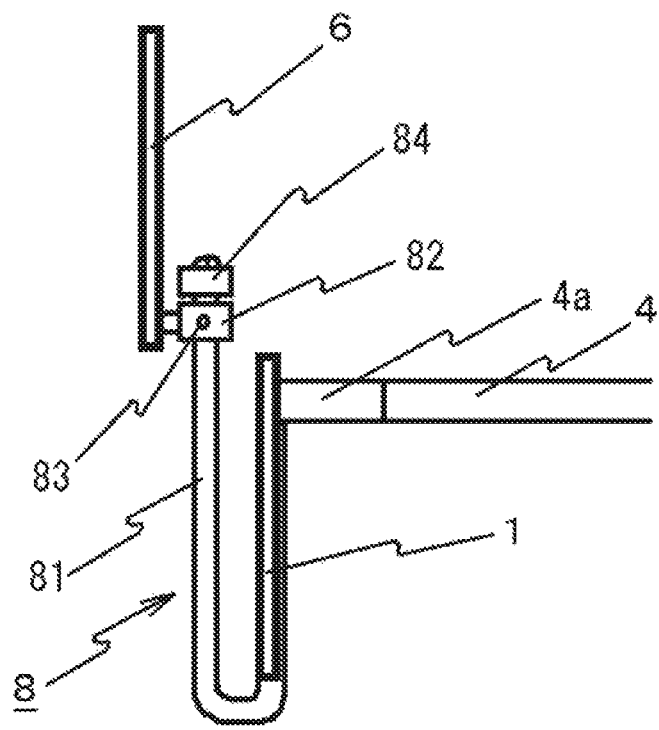
FIG. 3A is an explanatory view showing operations of the invention.

Next, operations of the exemplary embodiment will be described with reference to FIG. 3A and FIG. 3B. First, a state of FIG. 3A will be described. This state shows the eyeglasses worn in normal use. In this case, the movable lens-holding frames 6 are placed above the lens-holding frames 1 and the movable lens-holding frames 6 are each held by the stopper member 83 so as not to drop off.

Figure 3B:
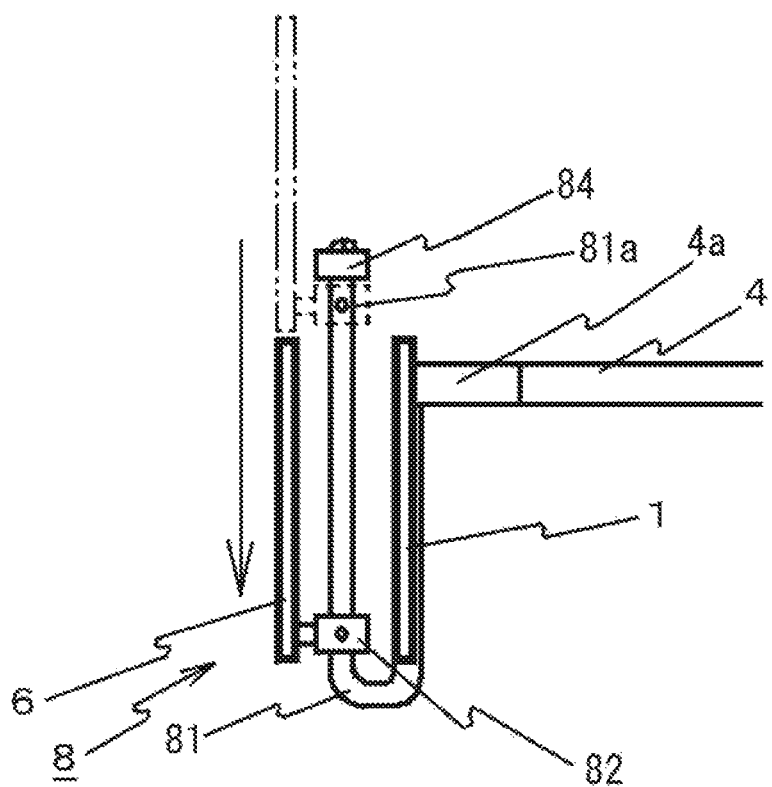
FIG. 3B is an explanatory view showing operations of the invention.

Next, when the movable lens-holding frames 6 are each grasped by hand and lowered as shown by an arrow in FIG. 3B, the bearing 82 moves downward along the support shaft 81, bringing the movable lens-holding frames 6 in front of the corresponding lens-holding frames 1. At this time, in a case where the lenses provided in the movable lens-holding frames 6 are, for instance, sunglasses, the sunglasses overlap the lenses for normal use to eliminate glare.

Further, in a case where the wearable terminal glasses are provided in the movable lens-holding frames 6 at this time, it is possible to obtain a wider variety of information than ever thought. It should be noted that in a case of providing the wearable terminal glasses, it is necessary to provide a switch (not shown) that is turned on when the movable lens-holding frames 6 are brought above the lens-holding frames 1 and turned off when the movable lens-holding frames 6 are brought oppositely in front of the lens-holding frames 1.

Further, in a case where the lenses provided in the movable lens-holding frames 6 are, for instance, convex lenses (reading glasses), it is not necessary to change an eye level (wearing state) of a wearer as compared with a conventional case of using typical bifocal glasses where an upper portion of each lens is allocated for long sight and a lower portion thereof is allocated for short sight (reading glasses), thus considerably reducing eye strain as compared with a typical product.

As described above, according to the exemplary embodiment, two types of lenses or the like are easily usable by vertically moving the movable lens-holding frames 6. Further, the movable lens-holding frames 6, which are restrained at both sides, are smoothly vertically movable with a significantly reduced wobbliness.

It should be noted that the invention is not limited to the above exemplary embodiment but may include modifications, improvements and the like as long as an object of the invention is achievable.

Figure 4:
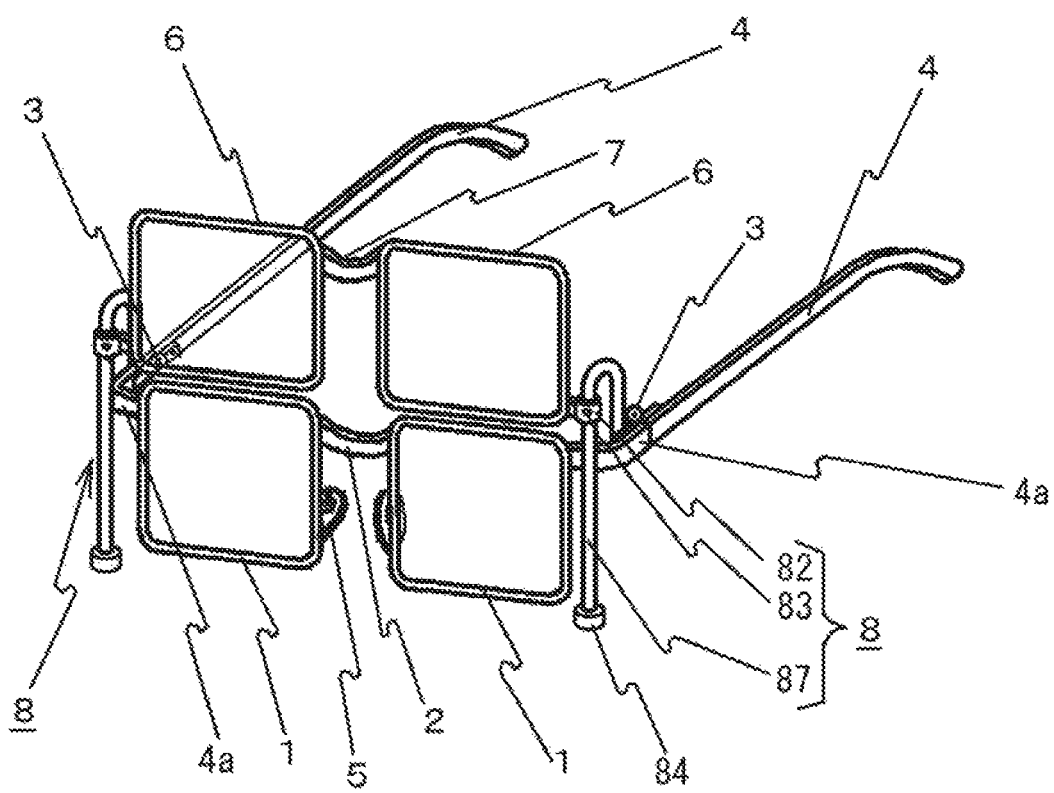
FIG. 4 is a perspective view of an eyeglass-shaped frame according to a modification of the invention.

For instance, the vertical movement unit 8 may include a support shaft 87 having a shape shown in FIG. 4, which is vertical inversion of the support shaft 81.

Figure 5:
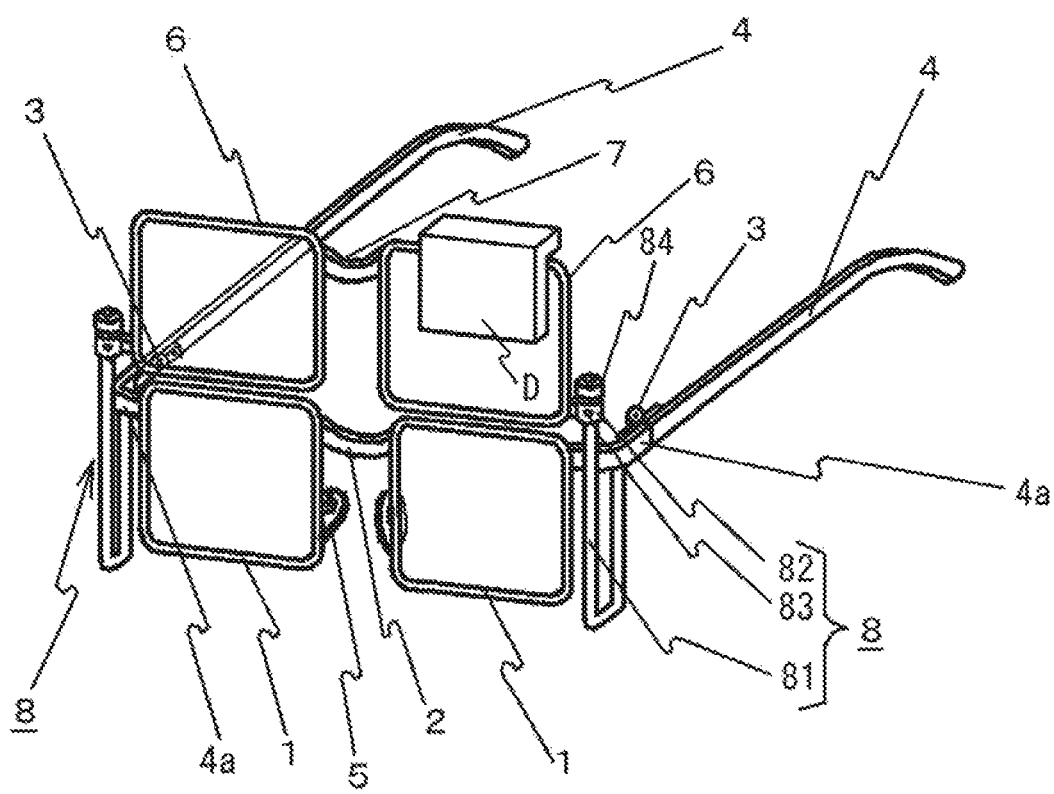
FIG. 5 is a perspective view of an eyeglass-shaped frame according to another modification of the invention.

The lens-holding frames 1 and the movable lens-holding frames 6 may hold a display D instead of lenses or in combination with lenses as shown in FIG. 5. The display D includes an optical device, such as a prism, a mirror, a semitransparent mirror, or a hologram device, and a projector configured to project an image. A transmissive (see-through) display, a non-transmissive (non-see-through) display, a retinal-scanning display, a retinal-projection display, and the like are usable as the display D. The transmissive display D and the non-transmissive display D are each configured to display an image projected by the projector such as a liquid crystal panel and an organic EL (Electro-Luminescence) panel. The retinal-scanning display D and the retinal-projection display D are each configured to project, for instance, a laser beam onto a retina.

The invention claimed is:

1. An eyeglass-shaped frame comprising:
   a pair of lens-holding frames each configured to hold an optical member comprising a lens;
   a bridge connecting the pair of lens-holding frames;
   a temple attached, at a front end thereof, to each of the lens-holding frames;
   a nose pad configured to support on a nose in contact;
   movable lens-holding frames configured to be placed in a lowered position oppositely in front of the lens-holding frames; and
   a vertical movement unit provided to the front end of the temple and supporting a lower portion of the movable lens-holding frames, the vertical movement unit having a linear slide with a length of travel greater than a height of the pair of lens-holding frames such that the vertical movement unit is configured to vertically move each of the movable lens-holding frames to a raised position where an entirety of the moveable lens-holding frames is located above the lens-holding frames.

2. The eyeglass-shaped frame according to claim 1, wherein
   the optical member comprises a display, and
   the lens-holding frames or the movable lens-holding frames are configured to hold the display.

3. The eyeglass-shaped frame according to claim 2, wherein
   the vertical movement unit comprises:
   a support shaft formed a substantial J-shape and fixed to the front end of the temple with the substantial J-shape inverted back to front;
   a bearing configured to receive the support shaft therein to be vertically movable while coupled to each of the movable lens-holding frames; and
   a stopper member configured to hold each of the movable lens-holding frames above a corresponding one of the lens-holding frames,
   wherein the support shaft and the bearing constitute the linear slide.

4. The eyeglass-shaped frame according to claim 2, wherein the vertical movement unit comprises:
   a support column that is in a form of a rectangular column with a guide groove and fixed, at an upper portion thereof, to the front end of the temple;
   an insertion piece configured to be received in the support column to be vertically movable while fixed to each of the movable lens-holding frames; and
   a stopper member configured to hold each of the movable lens-holding frames above a corresponding one of the lens-holding frames,
   wherein the support column and the insertion piece constitute the linear slide.

5. The eyeglass-shaped frame according to claim 1, wherein
   the vertical movement unit comprises:
   a support shaft formed a substantial J-shape and fixed to the front end of the temple with the substantial J-shape inverted back to front;
   a bearing configured to receive the support shaft therein to be vertically movable while coupled to each of the movable lens-holding frames; and
   a stopper member configured to hold each of the movable lens-holding frames above a corresponding one of the lens-holding frames,
   wherein the support shaft and the bearing constitute the linear slide.

6. The eyeglass-shaped frame according to claim 1, wherein the vertical movement unit comprises:
   a support column that is in a form of a rectangular column with a guide groove and fixed, at an upper portion thereof, to the front end of the temple;
   an insertion piece configured to be received in the support column to be vertically movable while fixed to each of the movable lens-holding frames; and a stopper member configured to hold each of the movable lens-holding frames above a corresponding one of the lens-holding frames, wherein the support column and the insertion piece constitute the linear slide.

7. An eyeglass-shaped frame comprising:

a pair of lens-holding frames;

a first optical member held by at least one of the pair of lens-holding frames;

a bridge connected between the pair of lens-holding frames;

a temple attached each of the lens-holding frames;

a pair of movable lens-holding frames;

a second optical member held by at least one of the pair of movable lens-holding frames; and a vertical movement mechanism fixed to the pair of lens-holding frames and movably secured to a lower portion of the pair of movable lens-holding frames, the vertical movement mechanism including a linear slide with a length of travel greater than a height of the pair of lens-holding frames such that the vertical movement mechanism is configured to move the pair of movable lens-holding frames from an in-use position where the first and second optical members overlap each other in a front-to-back orientation and a non-use position where the first and second optical members are entirely vertically offset from each other by the pair movable lens-holding frames being raised entirely above the pair of lens-holding frames.

8. The eyeglass-shaped frame according to claim 7, wherein the linear slide comprises:

a support shaft fixed to a front end of the temple; and a bearing receiving the support shaft therein.

9. The eyeglass-shaped frame according to claim 8, further comprising a stopper configured to hold the pair of movable lens-holding frames above the pair of lens-holding frames.

10. The eyeglass-shaped frame according to claim 7, wherein the linear slide comprises:

a rectangular support column with a guide groove fixed to a front end of the temple; and an insertion piece inserted in the support column.

11. The eyeglass-shaped frame according to claim 10, further comprising a stopper configured to hold the pair of movable lens-holding frames above the pair of lens-holding frames.

12. The eyeglass-shaped frame according to claim 7, wherein the vertical movement mechanism is fixed to a front end of each temple.

\* \* \* \* \*